United States Patent
Park et al.

(10) Patent No.: US 7,355,934 B2
(45) Date of Patent: Apr. 8, 2008

(54) OPTICAL DISC OF WRITE ONCE TYPE, METHOD, AND APPARATUS FOR MANAGING DEFECT INFORMATION ON THE OPTICAL DISC

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 601 days.

(21) Appl. No.: 10/670,379

(22) Filed: Sep. 26, 2003

(65) Prior Publication Data

US 2004/0145980 A1    Jul. 29, 2004

(30) Foreign Application Priority Data

| Jan. 27, 2003 | (KR) | 10-2003-0005214 |
| Feb. 11, 2003 | (KR) | 10-2003-0008564 |
| Apr. 1, 2003 | (KR) | 10-2003-0020386 |
| Jun. 11, 2003 | (KR) | 10-2003-0037618 |

(51) Int. Cl.
*G11B 7/00* (2006.01)

(52) U.S. Cl. ............................. 369/47.14; 369/53.17

(58) Field of Classification Search ............ 369/53.17, 369/47.14
See application file for complete search history.

(56) References Cited

U.S. PATENT DOCUMENTS

| 5,805,536 A | | 9/1998 | Gage et al. | |
| 6,477,126 B1 * | 11/2002 | Park et al. | ................ | 369/59.25 |
| 6,631,106 B1 * | 10/2003 | Numata et al. | ........... | 369/53.17 |
| 6,724,701 B2 * | 4/2004 | Ijtsma et al. | .............. | 369/47.14 |
| 6,738,341 B2 * | 5/2004 | Ohata et al. | .............. | 369/275.3 |
| 2004/0125716 A1 * | 7/2004 | Ko et al. | .................. | 369/47.14 |
| 2005/0083740 A1 * | 4/2005 | Kobayashi | ................... | 365/200 |
| 2005/0083830 A1 * | 4/2005 | Martens et al. | ........... | 369/275.4 |
| 2006/0203684 A1 * | 9/2006 | Ko et al. | ..................... | 369/100 |

FOREIGN PATENT DOCUMENTS

EP    1 148 493 A2    10/2001

* cited by examiner

*Primary Examiner*—Wayne Young
*Assistant Examiner*—Van T. Pham
(74) *Attorney, Agent, or Firm*—Birch, Stewart, Kolasch & Birch, LLP

(57) ABSTRACT

An optical disc of write once type, a method and an apparatus of managing defect information on the optical disc of write once type, e.g., a BD-WO, are provided with a temporary defect management area (TDMA). The method includes preparing the temporary defect management area (TDMA) in which a temporary defect list (TDFL) is recorded as defect management information for managing a defective area on the optical disc, recording the most recent temporary defect list cumulatively with the previous temporary defect list in the temporary defect management area, and recording position information for indicating a position of the most recent temporary defect list in the temporary defect management area along with the temporary defect list to more effectively manage the temporary defect list.

22 Claims, 13 Drawing Sheets

Single Layer BD-WO

Dual Layer BD-WO

| Disc | TDFL pointer | Stage 1 | Stage 2 | Stage 3 | · · · |
|---|---|---|---|---|---|
| SL/DL disc | 1st TDFL pointer | P1 | P2 | P3 | · · · |

FIG. 7B

| Disc | TDFL pointer | Stage 1 | Stage 2 | Stage 3 | · · · |
|---|---|---|---|---|---|
| SL disc | 1st TDFL pointer | P1 | P2 | P4 | · · · |
| | 2nd TDFL pointer | 0 | P3 | P5 | · · · |
| | 3rd TDFL pointer | 0 | 0 | 0 | · · · |
| | 4th TDFL pointer | 0 | 0 | 0 | · · · |
| DL disc | 5th TDFL pointer | 0 | 0 | 0 | · · · |
| | 6th TDFL pointer | 0 | 0 | 0 | · · · |
| | 7th TDFL pointer | 0 | 0 | 0 | · · · |
| | 8th TDFL pointer | 0 | 0 | 0 | · · · |

FIG. 8B

| Disc | TDFL pointer | Stage 1 | Stage 2 | Stage 3 | Stage 4 | ... |
|---|---|---|---|---|---|---|
| SL disc (DC disc) | 1st TDFL pointer | P1 | P2 | P2 | P6 | ... |
| | 2nd TDFL pointer | 0 | P3 | P4 | P7 | ... |
| | 3rd TDFL pointer | 0 | 0 | P5 | P8 | ... |
| | 4th TDFL pointer | 0 | 0 | 0 | 0 | ... |
| DL disc | 5th TDFL pointer | 0 | 0 | 0 | 0 | ... |
| | 6th TDFL pointer | 0 | 0 | 0 | 0 | ... |
| | 7th TDFL pointer | 0 | 0 | 0 | 0 | ... |
| | 8th TDFL pointer | 0 | 0 | 0 | 0 | ... |

FIG. 9B

| Disc | TDFL pointer | Stage 1 | Stage 2 | Stage 3 | · · · |
|---|---|---|---|---|---|
| SL disc | 1st TDFL pointer | P1 | P2 | P4 | · · · |
| | 2nd TDFL pointer | 0 | P3 | P5 | · · · |
| | 3rd TDFL pointer | 0 | 0 | 0 | · · · |
| | 4th TDFL pointer | 0 | 0 | 0 | · · · |
| DL disc | 5th TDFL pointer | 0 | 0 | 0 | · · · |
| | 6th TDFL pointer | 0 | 0 | 0 | · · · |
| | 7th TDFL pointer | 0 | 0 | 0 | · · · |
| | 8th TDFL pointer | 0 | 0 | 0 | · · · |

OPTICAL DISC OF WRITE ONCE TYPE, METHOD, AND APPARATUS FOR MANAGING DEFECT INFORMATION ON THE OPTICAL DISC

This application claims the benefit of Korean Patent Application Nos. P2003-005214 filed on Jan. 27, 2003; P2003-008564 filed on Feb. 11, 2003; P2003-020386 filed on Apr. 1, 2003; and P2003-037618 filed on Jun. 11, 2003, the entirety of each of which are hereby incorporated by reference.

BACKGROUND OF THE INVENTION

1. Field of the Invention

The present invention relates to a method for managing a defective area on a high density optical disc, and more particularly to a write once optical disc, an apparatus and a method for managing a defective area on a high density optical disc such as a Blu-ray Disc Write Once (BD-WO).

2. Background of the Related Art

Optical discs on which a large capacity of data can be written as optical recording media have widely been used. Among them, a new HD-DVD (High-Density Digital Versatile Disc) on which video data and audio data can be written and stored in high quality and in large quantities, e.g., a BD (Blu-ray Disc), has been recently developed.

The Blu-ray disc, which belongs to the next-generation HD-DVD technology, is the next-generation optical recording solution that can strikingly surpass the data recording capability of existing DVDs. The Blu-ray disc world standards of HD-DVD that have recently been established include the use of a celadon laser having a wavelength of 405 nm that is much denser than a red laser of existing DVD technology having a wavelength of 650 nm. Accordingly, a greater amount of data than the existing DVD technology can be stored on the BD that has a thickness of 1.2 mm, a diameter of 12 cm, and an optical transmission layer having a thickness of 0.1 mm.

As various kinds of standards related to the BD (Blu-ray Disc) are being developed, various kinds of standards for BD-RE (BD Re-writable disc) and BD-WO (BD Write Once disc) are being developed. One of the new high density optical discs, on which high quality video and audio data can be written, erased and rewritten for long periods of time, is a Blu-ray Disc Re-writable (BD-RE) that is currently being developed.

FIG. 1 schematically illustrates the structure of a recording area of a BD-RE. The BD-RE of FIG. 1 shows the structure of the recording area of a disc having one recording layer. Seen from the inner periphery of the disc, the recording area is divided into a lead-in area, a data area, and a lead-out area. An inner spare area ISA0 and an outer spare area OSA0 for replacement of a defective area are provided on the inner and outer peripheries of the data area, and a user data area for recording user data is provided in the center of the data area.

If a defective area exists in a user data area during recording of data on a BD-RE, the data recorded in the defective area is shifted to and recorded in a spare area as replacement data. Also, position information relating to the defective area and the replacement data recording area is recorded in defect management areas DMA 1, DMA 2, DMA 3 and DMA 4 provided in the lead-in and lead-out areas. The position information serves as management information for the defective area to perform defect management for the optical disc. In the case of the BD-RE, since rewriting is possible in any area of the disc, the whole area of the disc can randomly be used irrespective of its recording mode.

The Blu-ray Disc Write-Once (BD-WO) is another type of high density optical disc that is being developed where a high quality of data can be recorded and reproduced to and from the disc. As the name may suggest, data can be written only once on the BD-WO and is not re-writable on the BD-WO. However, the BD-WO can be read repeatedly. As a result, the BD-WO is useful where the rewritability of data on a recording medium is not desired or essential.

Discussions on the standardization of high density optical discs, e.g., such as BD-WO, have recently been underway. In this regard, a disc structure, a method and an apparatus for managing defective areas of the BD-WO are needed, which accommodate and consider the unique characteristics and intended operations of the BD-WO. Such techniques will render the BD-WO commercially marketable and operationally feasible.

In the BD-WO (Blu-ray Disc Write Once), since only a single recording of data in a specified area of the disc is possible, the recording mode is greatly restricted. Accordingly, it is difficult to randomly use the whole area of the disc due to its management difficulty. Also, in a high-density optical disc of write once type, such as the BD-WO, the management of the defective area becomes an important aspect of data recording. Accordingly, the optical disc of write once type requires a unified standard of management for defect information on optical discs of this type.

SUMMARY OF THE INVENTION

Accordingly, the present invention is directed to an optical disc of write once type and a method and apparatus for managing defect information on the optical disc that substantially obviate one or more problems and/or disadvantages of the background art.

An object of the present invention is to provide a method of identifying a defective area and a method of managing the defective area.

One or more of these and other objects of the present invention are accomplished by a method for managing an optical recording medium having at least one defective area in a user data area, the method comprising recording at least one temporary defect list in a temporary defect management area, wherein the at least one temporary defect area list is recorded as defect management information for managing the at least one defective area; and recording position information as at least one temporary defect list pointer, wherein the temporary defect list pointer indicates at least a position of the temporary defect list for a respective recording unit of the temporary defect management area.

One or more of these and other objects of the present invention are accomplished by a method for managing an optical recording medium having at least one defective area in a user data area, the method comprising recording at least one temporary defect list in a temporary defect management area, wherein the at least one temporary defect area list is recorded as defect management information for managing the at least one defective area; separately recording the temporary defect lists as separate defect lists for each recording unit of the temporary defective management area; and recording position information as at least one temporary defect list pointer, wherein the temporary defect list pointer indicates at least a position of the temporary defect list for a respective recording unit of the temporary defect management area.

One or more of these and other objects of the present invention are accomplished by a recording medium comprising a user data area within a data area; a temporary defect management area for recording defect management information, wherein the defect management information is provided for managing replacement data of at least one defective area within the user data area of the recording medium; a first defect management area being provided in the temporary defect management area; and a second defect management area being provided in the temporary defect management area for recording position information that indicates a position of the most recent defect list.

One or more of these and other objects of the present invention are accomplished by a recording medium comprising a user data area within a data area; a temporary defect management area for recording defect management information, wherein the defect management information is provided for managing replacement data of at least one defective area within the user data area of the recording medium; a temporary defect list in the temporary defect management area, wherein the temporary defect list is recorded as defect management information for managing the at least one defective area; and at least one temporary defect list pointer containing position information, wherein the temporary defect list pointer indicates at least a position of the most recent temporary defect list in the temporary defect management area.

One or more of these and other objects of the present invention are accomplished by an apparatus for managing an optical recording medium having at least one temporary defect management area, and a spare area in a data area, the apparatus comprising a device for recording at least one temporary defect list in a temporary defect management area, wherein the at least one temporary defect list is recorded as defect management information for managing the at least one defective area; and for recording position information as at least one temporary defect list pointer, wherein the temporary defect list pointer indicates at least a position of the most recent temporary defect list in the temporary defect management area and the temporary defect list.

One or more of these and other objects of the present invention are further accomplished by An apparatus for managing an optical recording medium having at least one temporary defect management area, and a spare area in a data area, the apparatus comprising a device for recording at least one temporary defect list in a temporary defect management area, wherein the at least one temporary defect area list is recorded as defect management information for managing the at least one defective area; for separately recording the temporary defect lists as separate defect lists for each recording unit of the temporary defective management area; and for recording position information as at least one temporary defect list pointer, wherein the temporary defect list pointer indicates at least a position of the temporary defect list for a respective recording unit of the temporary defect management area.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIGS. 7A and 7B illustrate a method of managing defect information on an optical disc of write once type according to a second embodiment of the present invention;

FIGS. 8A and 8B illustrate a method of managing defect information on an optical disc of write once type according to a third embodiment of the present invention; and FIGS. 9A and 9B illustrate a method of managing defect information on an optical disc of write once type according to a fourth embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
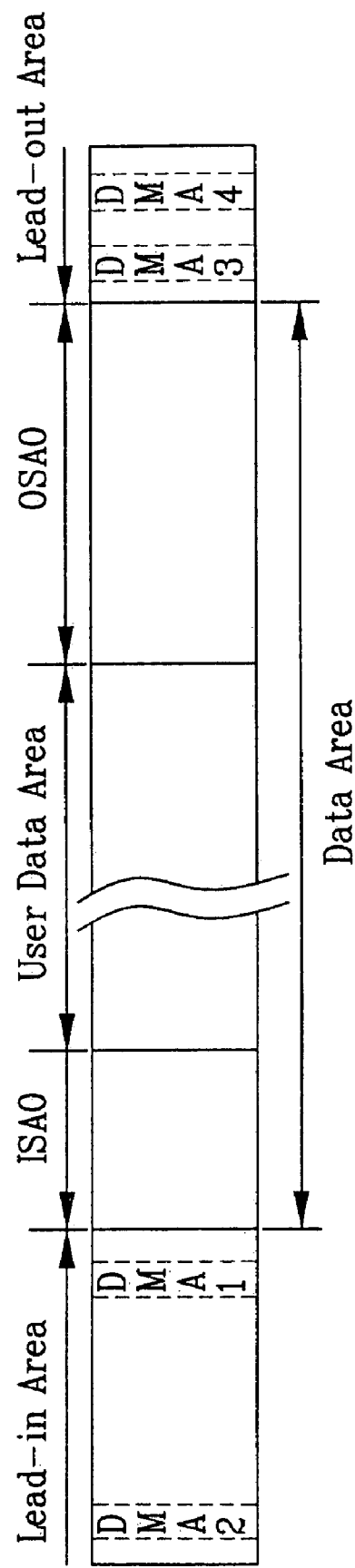
FIG. 1 illustrates the structure of a rewritable optical disc of the related art.
Figure 2:
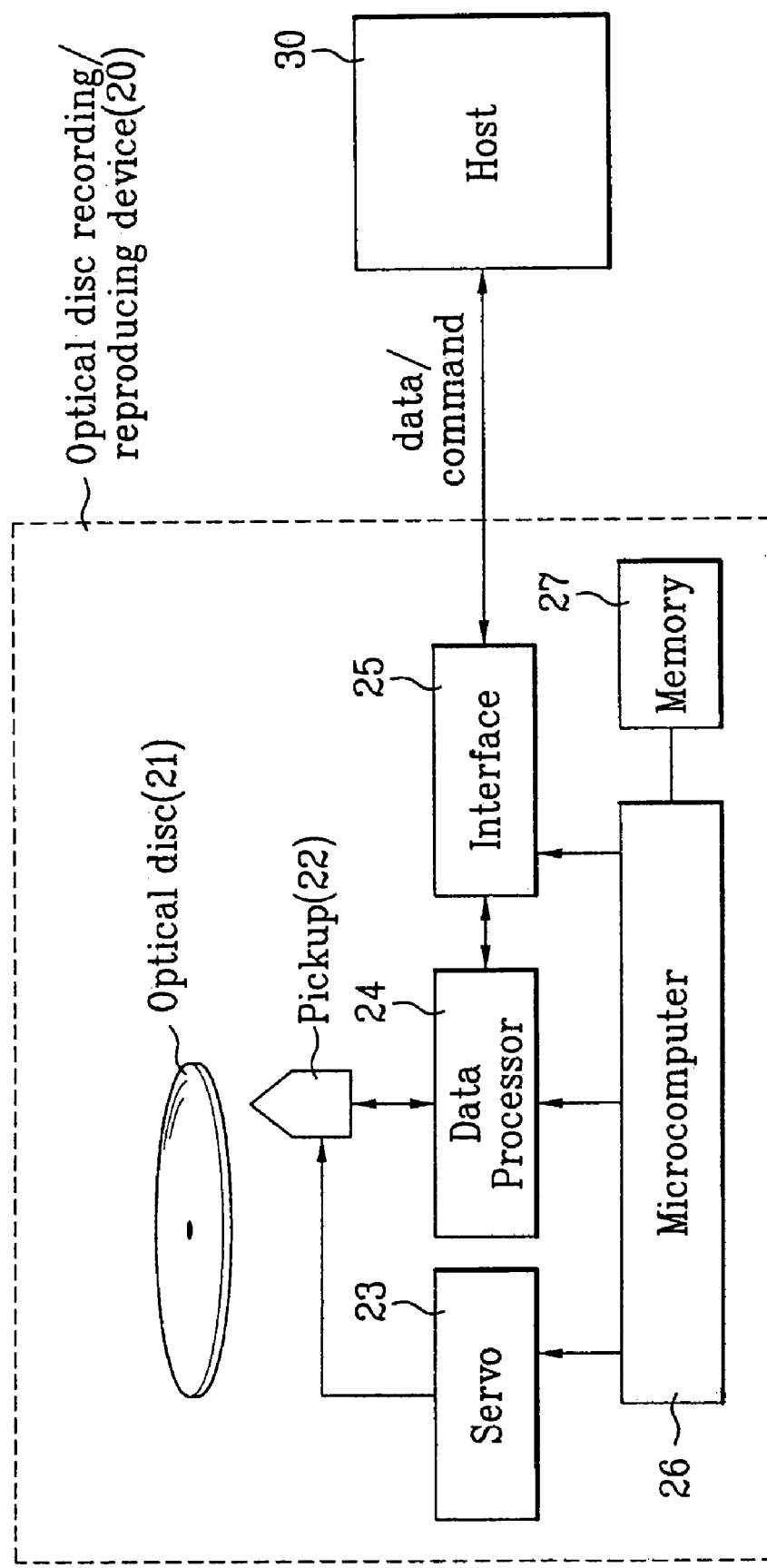
FIG. 2 is a block diagram of an optical disc recording and/or reproducing device according to an embodiment of the present invention.

FIG. 2 is a block diagram of an optical disc recording and/or reproducing device 20 according to an embodiment of the present invention. The optical disc recording and/or reproducing device 20 (hereinafter optical disc recording/reproducing device) includes an optical pickup 22 for writing and reading data to and from an optical recording medium 21, a servo unit 23 for controlling the pickup 22 to maintain a distance between an objective lens of the pickup 22 and the recording medium 21 and for tracking relevant tracks on the recording medium 21, a data processor 24 for processing and supplying input data to the pickup 22 for writing, and for processing data read from the recording medium 21, an interface 25 for exchanging data and/or commands with any external host 30, a memory or storage 27 for storing information and data therein including defect management data associated with the recording medium 21, and a microprocessor or controller 26 for controlling the operations and elements of the recording/reproducing device 20.

Data to be written or read to or from the recording medium 21 may also be stored in the memory 27. All the components of the recording/reproducing device 20 are operatively coupled. In the exemplary embodiment shown, the recording medium 21 is a recording medium of write-once type, e.g., such as a BD-WO.

Figure 3A:
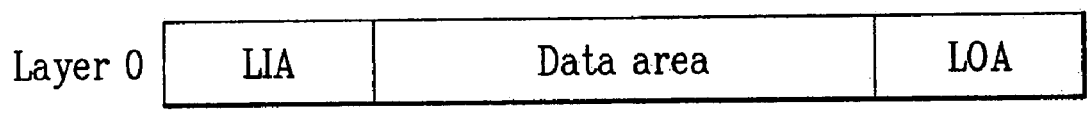
FIGS. 3A and 3B illustrate a structure of a single layer BD-WO and a dual layer BD-WO optical disc, respectively, according to an embodiment of the present invention.
Figure 3B:
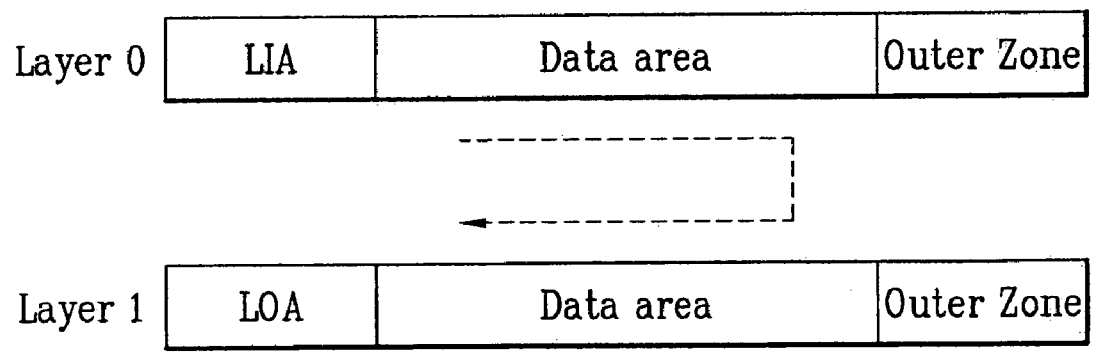

FIGS. 3A and 3B illustrate a structure of a single layer BD-WO and a dual layer BD-WO optical disc, respectively, according to an embodiment of the present invention. As shown in FIGS. 3A and 3B, the BD-WO can have one or two recording layers. In FIG. 3A, a BD-WO having only a single recording layer (Layer 0) includes a single recording layer composed of a lead-in area (LIA), a data area, and a lead-out area (LOA), and is referred to herein as a single layer disc.

In FIG. 3B, a dual layer BD-WO includes two recording layers (Layers 0 and 1) and is referred to hereinafter as a dual layer disc. The first recording layer (Layer 0) includes a LIA, a data area, and an outer zone. The second recording layer (Layer 1) includes a LOA, a data area and an outer zone. Generally, a data writing occurs in the direction shown with the dotted arrow in the dual layer disc. The single layer disc can have a capacity of 23.3, 25.0 or 27.0 Gbytes, whereas the dual layer disc can have a capacity of 46.6, 50.0, or 54.0 Gbytes.

It should be noted that all the different embodiments of the present invention, e.g., various methods discussed hereinafter, are applicable to any type of an optical disc, such as a single layer BD-WO, a dual layer BD-WO or a BD-RE. Further, although the use of the recording/reproducing device 20 of FIG. 2 is discussed below in conjunction with the methods of the invention, the invention is not limited to such and encompasses other recording/reproducing devices as long as they are configured to implement the present methods. A detailed description of the preferred embodiments will be provided hereinafter with reference to an exemplary BD-WO (Blu-ray Disc Write Once).

Figure 4:
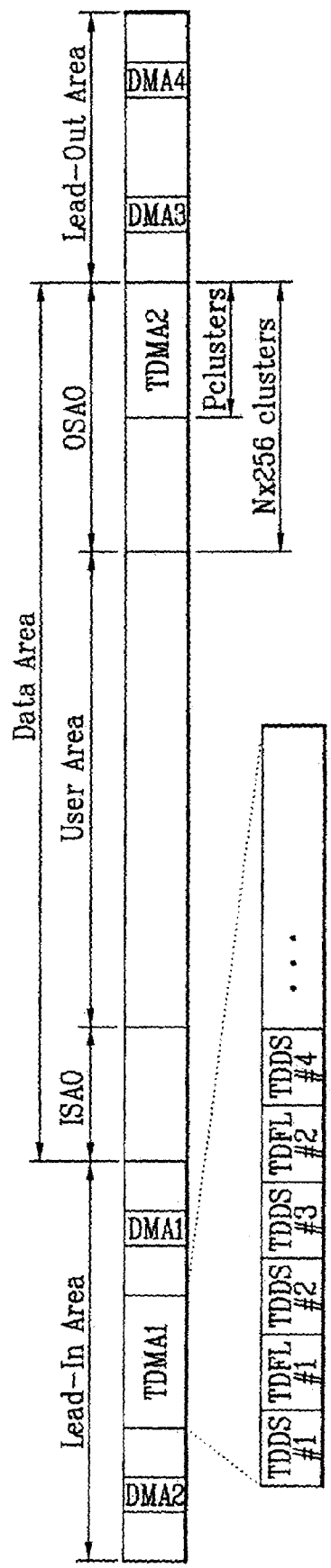
FIG. 4 illustrates the structure of an optical disc of write once type according to an embodiment of the present invention.

FIG. 4 shows an example of the structure of an optical disc of write once type, e.g., a BD-WO, and the method of recording disc management information according to the present invention. The optical disc of write once type of FIG. 4 is a single-layer disc having one recording layer. This optical disc includes spare areas, e.g., inner and outer spare areas ISAO/OSAO, for recording of replacement data of a defective area, and one or more TDMAs (Temporary Defect Management Area) for managing information relating to the defective area, e.g., in order to manage a physical defect.

In the case of a general rewritable optical disc, data can be repeatedly written and erased from a DMA (Defect Management Area) even if the DMA has a limited size, and thus a DMA of a large size is not required. However, in the case of an optical disc of write once type, e.g., a BD-WO, an area that has data recorded thereon cannot be used for recording data again, and a management area of a larger size is required with this type of recording medium. If no further recording is made on the optical disc of write once type, the final or latest TDMA (Temporary Defect Management Area) information is required to be transferred to and recorded in the DMA (Defect Management Area), and thus it is referred to as the TDMA (Temporary DMA) in distinction from the DMA.

Figure 5A:
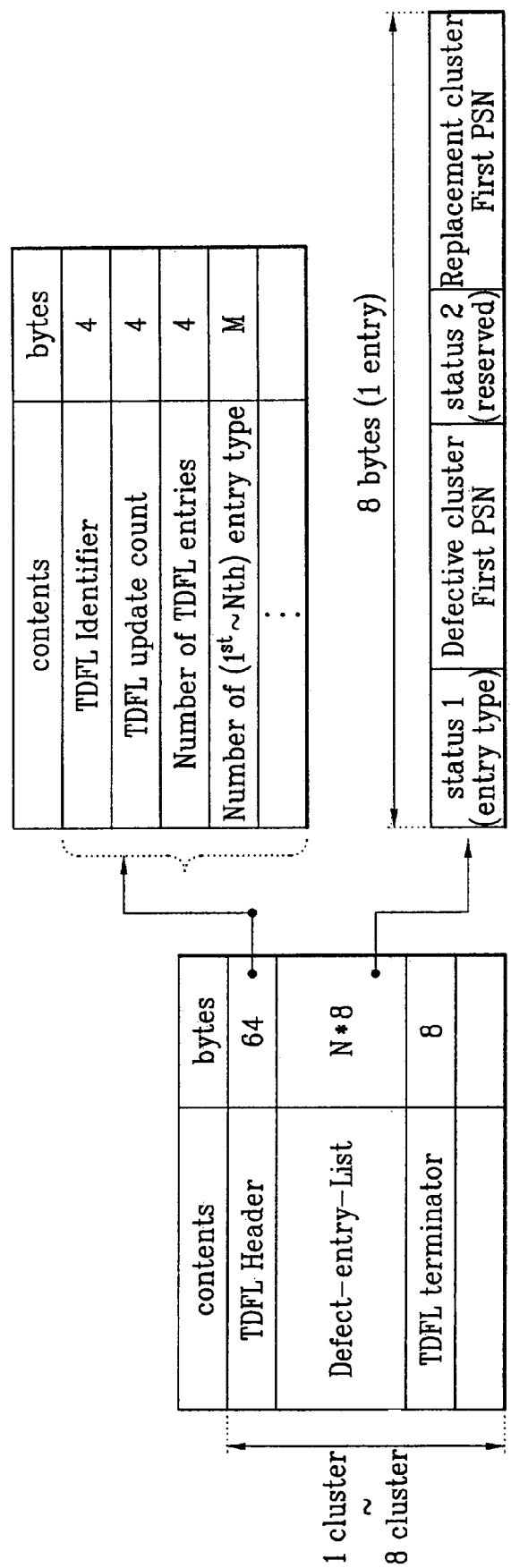
FIGS. 5A and 5B illustrate examples of the structure of TDFL and TDDS applied to an optical disc of write once type according to the present invention.
Figure 5B:
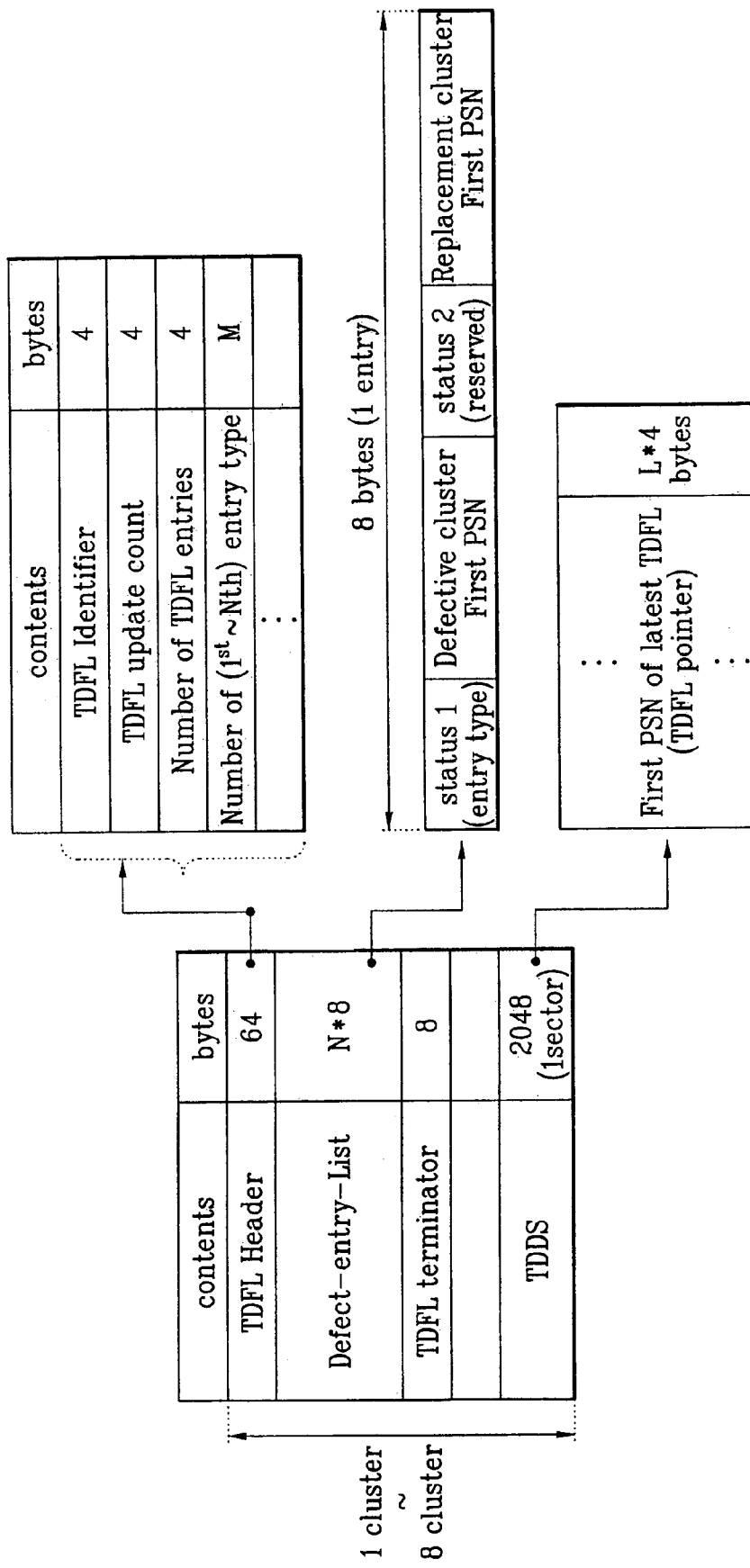

In FIG. 4, a TDMA1 is provided in a lead-in area with a fixed size and a TDMA2 having a size variable or associated with a size of the respective outer spare area (OSAO) in which it is provided, e.g., as seen in FIGS. 4-5B, P=(N*256)/4 is provided. The respective TDMA serves to store therein a TDFL (Temporary Defect List) and a TDDS (Temporary Disc Definition Structure) for defect management.

The TDFL is an entry list containing information for managing a series of processes for replacement of data in a defective area of the data area in the spare area. The size of the TDFL varies according to the size of the defective area, e.g., in the case of a single layer disc, the TDFL is prepared with a size of between 1-4 clusters, and in the case of a dual layer, the TDFL is prepared with a size of between 1-8 clusters.

The TDDS may be prepared in the unit of a single cluster, or both the TDDS and the TDFL are prepared in the unit of a single cluster. The TDDS includes information for management of the optical disc of write once type and information relating to the defect management required in the present invention. The defect management information is information located partially within the TDFL and the TDDS.

Hereinafter, the detailed contents of the TDFL and the TDDS will be explained with reference to FIGS. 5A and 5B. FIG. 5A illustrates an example of the structure of the TDFL applied to the present invention. The TDFL is generally divided into three parts: a TDFL header, a defect entry list (Defect_entry_List) and an indicator for the termination of the TDFL (TDFL terminator).

The TDFL header is at the leading portion of the TDFL and is used for recognizing the TDFL during defect management. The TDFL header includes a TDFL identifier, a TDFL update count field that increases a count by 1 whenever the TDFL is updated, a field for the number of defect entries that exist in the corresponding TDFL (number of TDFL entries), and a field containing the number of entry types (number of first to N-th entry types).

The defect entry list (Defect_entry_List) actually includes the contents that makeup the TDFL, e.g., the defect entry list is for managing position information of the defective area and the replacement area for each defective area in a single entry or location. Each entry is made up of 8 bytes of data, and the structure of a each entry includes an entry type (status 1), position information of the defective area (Defective cluster First PSN), and position information of the replacement area for replacement data (replacement cluster First PSN) recorded in order within the entry.

The TDFL terminator includes information that indicates the termination of the defect entry list (Defect_entry_List). In the case of a dual-layer disc, the defect entry list (Defect_entry_List) occupies 8 clusters at a maximum, and in the case of a single-layer disc, the defect entry list (Defect_entry_List) occupies 4 clusters at a maximum.

In FIG. 5B, the TDFL has the same structure as that of FIG. 5A, but the TDDS is now recorded along with TDFL information, e.g., the TDDS may be recorded in a different location than the TDFL (as shown in FIG. 5A), and/or may be recorded in the same cluster along with the TDFL (FIG. 5B).

In the TDDS, a variety of information may be recorded. However, in a preferred embodiment of the present invention, the TDDS should include position information of the latest TDFL (First PSN of latest TDFL). In the optical disc of write once type, the position in which the latest TDFL is recorded is changed whenever the TDFL is updated with respect to the defective area. Accordingly, it is necessary to manage the latest TDFL position information at all times. The position in which the latest TDFL is recorded may be referred to as a TDFL pointer, since it contains information that indicates the position information of the latest TDFL. However, the quantity of latest TDFL position information may be changed according to the recording method of the TDFL, which will be explained in greater detail hereinafter.

The term First PSN used in the present invention and shown in the accompanying figures refers to the first physical sector number of a cluster. In the case of a BD-WO, the minimum recording unit is defined as one cluster, and since 32 sectors generally exist in a single cluster, the First PSN refers to the position information of the leading sector in the corresponding cluster. Consequently, the First PSN refers to the position information of the corresponding cluster, e.g., defective cluster First PSN for the first physical sector number of the defective cluster.

A method of recording a TDFL and a method of recording a TDFL pointer according to the various embodiments of the present invention will be explained in greater detail hereinafter. The defect entry list (Defect_entry_List) is expressed as TDFL1, TDFL1c, TDFL21, TDFL32, etc, to assist in the following description of FIGS. 6A-6B. TDFL1 refers to entries prepared at the first stage (stage 1), and TDFL1c refers to TDFL1 after it has been cumulatively recorded. TDFL21 refers to first entries prepared at the second stage (stage2), and TDFL32 refers to second entries prepared at the third stage (stage3).

Figures 6A, 6B:
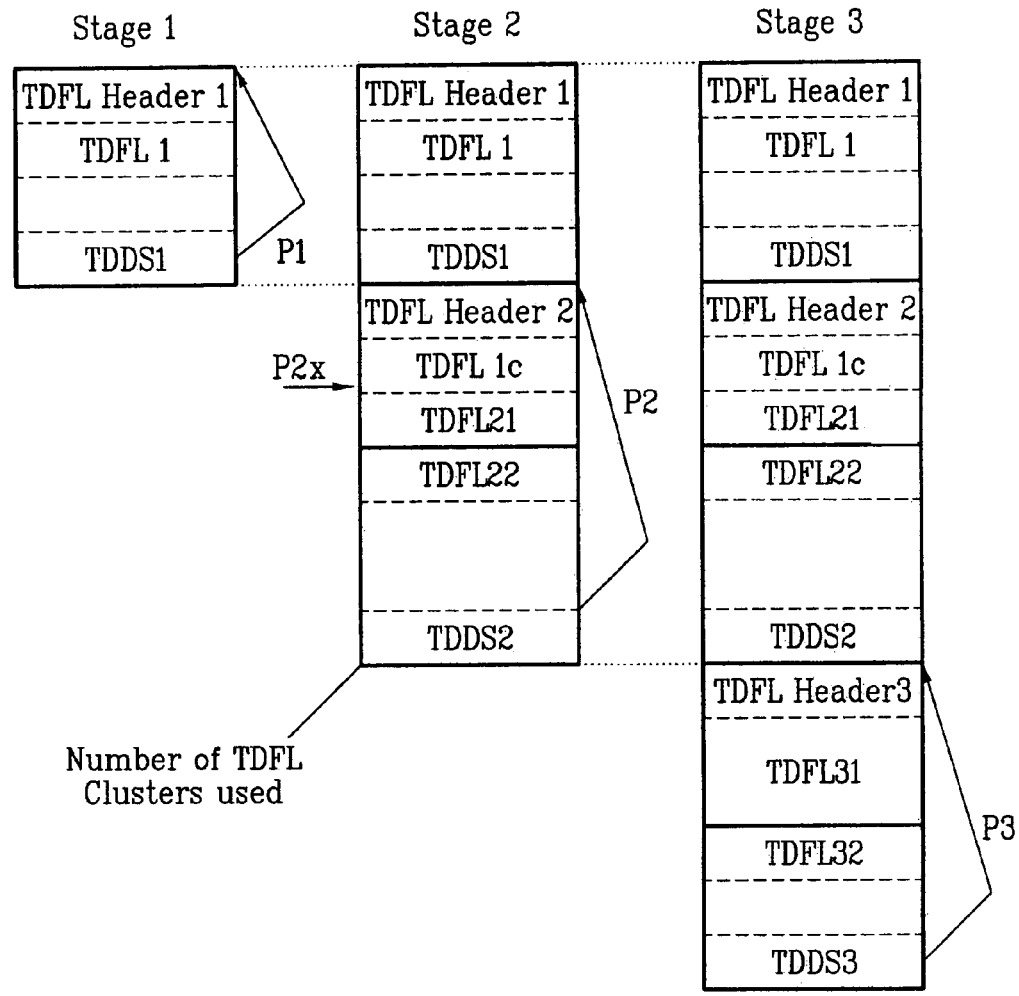
FIGS. 6A and 6B illustrate a method of managing defect information on an optical disc of write once type according to a first embodiment of the present invention.

The TDFL terminator has been omitted in FIGS. 6A and 6B to reduce the complexity of these figures, and the latest TDFL position information (TDFL pointer) recorded in the TDDS is expressed as P1, P2, P3, . . . respectively. Also, the cluster that is the recording unit is illustrated with a thick solid line to more prominently mark the contents of the TDMA.

FIGS. 6A and 6B illustrate a method of managing defect information on an optical disc of write once type according to the first embodiment of the present invention. According to the method of managing defect information according to the first embodiment of the present invention as shown in FIG. 6A, the latest TDFL is repeatedly recorded cumulatively with the previous TDFL. Accordingly, only one TDFL header and one TDFL pointer are used with respect to the TDFL of the cumulatively repeated 1-4 clusters (or 1-8 clusters), respectively. The TDFL header and the TDFL are recorded and managed in the unit of single cluster. In the case of a single layer (SL) disc, the size of the TDFL varies from 1 cluster to 4 clusters, and in the case of a double layer (DL) disc, the size of the TDFL varies from 1 to 8 clusters.

At the first stage (stage1), a part of the TDFL information, a TDFL header1 and a TDFL1 are recorded in a single cluster in the exemplary sequence shown. In the TDDS, information (TDDS 1) that indicates the position of the latest defect management information is recorded. In FIG. 6A, the information that indicates the position of the latest defect management information, e.g., the TDLF pointer, is expressed as P1 as described above. The position information indicated by this pointer is the first PSN, i.e., address of the corresponding cluster. For example, in FIG. 6A, the pointer P1 indicates the position of the TDFL header 1.

At the second stage (stage2) shown in FIG. 6A, TDFL21 and TDFL22 are further recorded during an update operation. The defect management information is recorded in a once-recordable state in the recording unit of a single cluster on the disc. During the recording of the defect management information at the second stage stage2, TDFL21 and TDFL22 (corresponding to new TDFL information obtained during the present update operation), and the previously recorded TDFL information (TDFL1c that is identical to TDFL1), are recorded along with the corresponding TDFL header2 and TDDS2. That is, the TDFL information is cumulatively recorded at each update stage along with any new TDFL information. The second stage (stage2 refers to the recording method in the case that the list information of the defect management area exceeds a single cluster, but is less than 2 clusters. For example, TDFL header2+TDFL1c+TDFL21 equals a single cluster in size. Therefore, when the TDFL22 is recorded this TDFL occupies a partial area of the second successive cluster, and TDFL header2 contains the contents of the TDFL1c, TDFL21 and TDFL22. The pointer value recorded in the TDDS2 shows that the latest defect information position P2 is recorded, the PSN of TDFL Header 2. Since the defect management information is cumulatively recorded, only the latest PSN is necessary as a pointer. In this embodiment, only one TDFL header and one TDDS having the TDFL pointer are generated and recorded at every stage.

In each stage, a sorting to sort the existing TDFLs can be performed. The sorting can be done based on certain predetermined criteria. For instance, the TDFLs can be sorted first based on status 1 (see FIG. 5B) and can be further sorted based on the first PSN of the TDFL. Obviously, other criteria can be used.

The defect management information after a sorting has been performed is shown as an example at the third stage (stage3). Here, the defect management information is sorted according to the PSN of the TDFL entry and based on the TDFL entry type (status 1). From a viewpoint of the second stage (stage2), the sorting is performed under the assumption that a new TDFL entry is produced to be included in a P2x position.

If a new TDFL entry to be recorded is produced, the new TDFL should be recorded by reflecting the list information of the defective area sorted according to the sorting rule as described above. The third stage (stage3) shows this. Since all the information of TDFL1c, TDFL21 and TDFL22 are changed through sorting by the P2x, the changed defect management area list information is recorded as the TDFL31, TDFL32, etc. and the TDFL header3 corresponding to the TDFL31, TDFL32, etc. is recorded in the lead of the corresponding information.

In the TDDS3, the position information P3 of the latest defect management information is recorded. The TDFL31 occupies a single cluster, and the TDFL32 occupies less than a single cluster, following the TDFL31. Accordingly, at the third stage, the defective area management information exceeds a single cluster, but is less than 2 clusters.

In summary, according to the method of managing defect information on an optical disc of write once type according to the first embodiment of the present invention, the TDFL is cumulatively recorded in the recording unit of a single cluster whenever it is updated. The TDDS then expresses the position of the latest defect management information (TDFL) with one pointer only. Also, in the case that the defect management information is changed according to a sorting rule, it can adaptively cope with such a change.

In FIG. 6A, the TDFL header has the information that indicates the number of clusters currently used. This means that a flag for representing how many clusters are used for representing the defect management area list can be employed since the size of the defect management information is variable. It is also possible to record the information for representing the number of clusters currently used in not only the TDFL header, but also the TDDS.

FIG. 6B shows a table that represents the change of the TDFL pointer by stages according to the first embodiment of the present invention. In the first embodiment, it can be recognized that only one pointer is required for each stage.

Figure 7A:
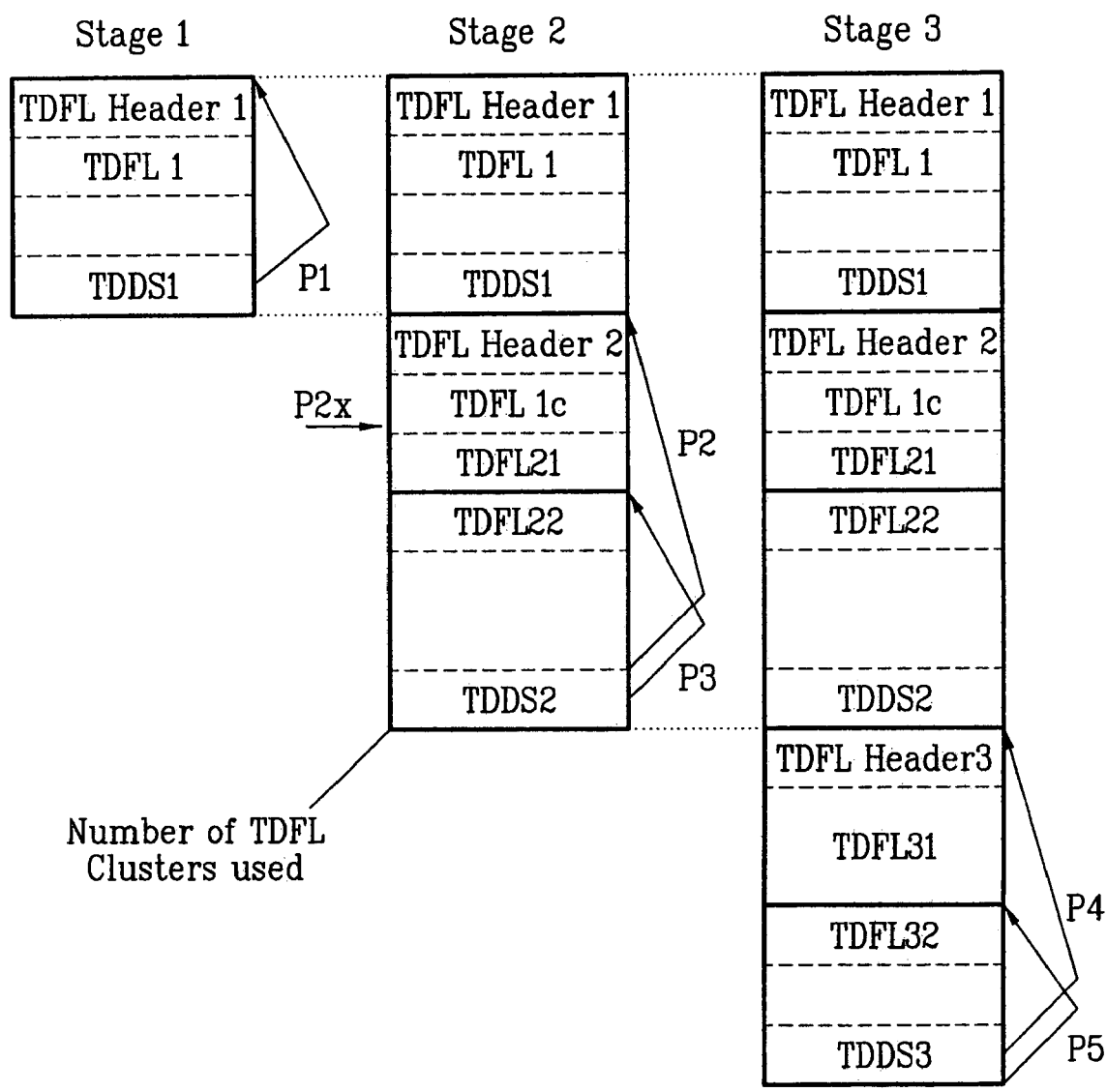

FIGS. 7A and 7B illustrate a method of managing defect information on an optical disc of write once type according to the second embodiment of the present invention. According to the method of managing defect information according to the second embodiment of the present invention as shown in FIG. 7A, the latest TDFL is repeatedly recorded cumulatively with the previous TDFL. Therefore, only one TDFL header and one TDFL pointer are used for each cluster with respect to the TDFL of the cumulatively repeated 1-4 clusters (or 1-8 clusters). The TDFL recorded for each stage is the same as that in the first embodiment.

In the second embodiment, one TDFL pointer is used for the corresponding cluster with respect to the TDFL size that increases by stages. Accordingly, even if a defect is identified during the recording of the cluster indicated by TDFL pointer P3 at the second stage (stage2), the defect is overcome through re-recording of only the cluster corresponding to that defect, i.e., the cluster including or beginning with TDFL22. The pointer can be changed to point to the re-recorded area. If it is re-recorded, the defect can be overcome through the change of only the pointer indicated by P3. Thus, the TDMA required for the preparation of the TDFL can be reduced.

FIG. 7B shows a table that represents the change of the pointer of the TDFL as the TDFL is updated by stages according to the second embodiment of the present invention. In the second embodiment, eight pointers may be required at maximum, and pointers that were not used at the respective stages are set to zero. In this example, the first TDFL pointer points to the P1 location, P2 location and P4 location at stages 1, 2, 3, respectively. The second TDFL pointer points to P3 and P4 locations at stages 2 and 3, respectively. The second TDFL pointer can indicate a pointer change form the first or previous TDFL pointer location, which may be due to the re-recording of certain cluster due to a defect as discussed above.

Figure 8A:
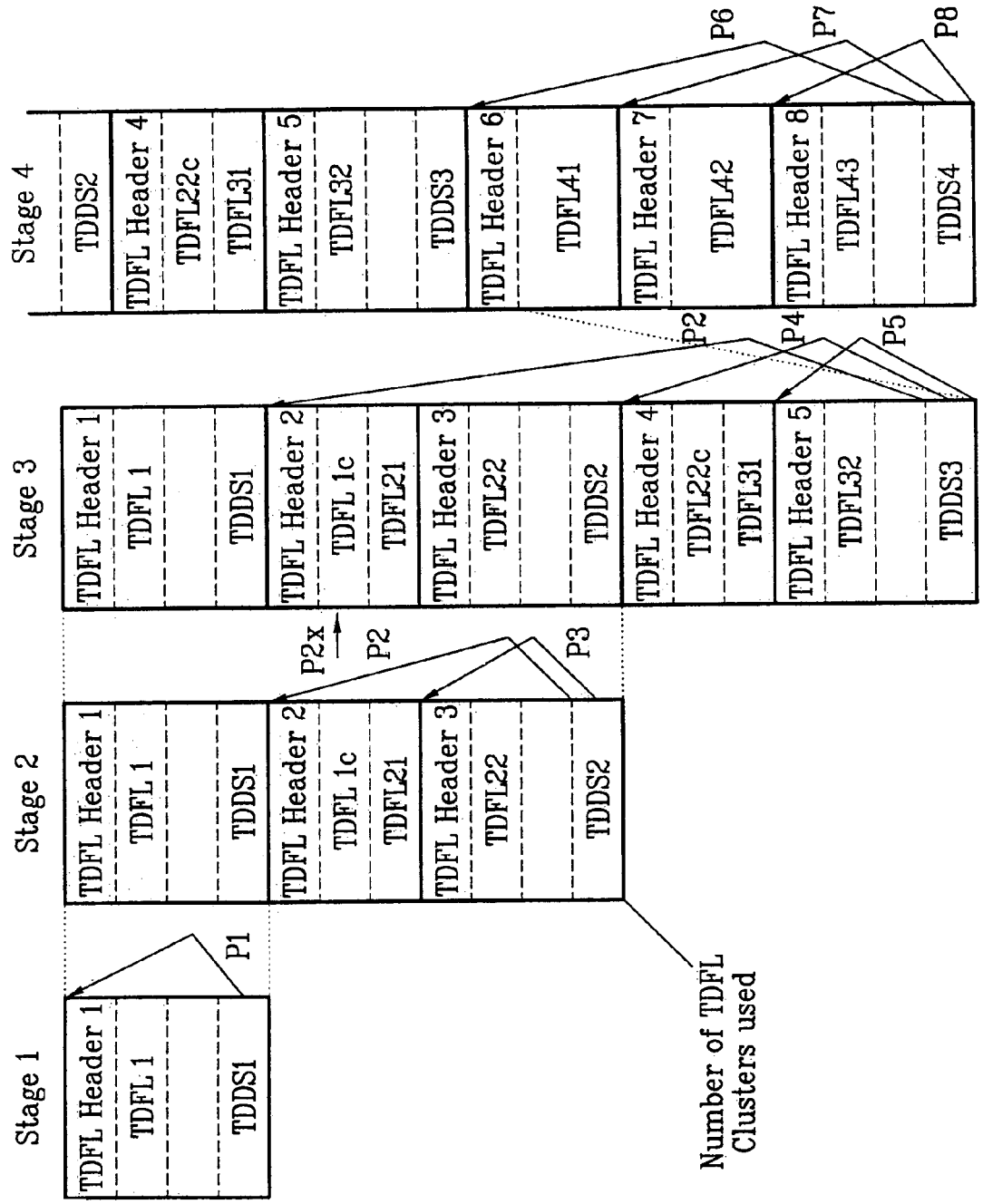

FIGS. 8A and 8B illustrate a method of managing defect information on an optical disc of write once type according to the third embodiment of the present invention. According to the method of managing defect information according to the third embodiment of the present invention as shown in FIG. 8A, the latest TDFL is repeatedly recorded cumulatively with the previous TDFL in a single cluster, but the TDFL is also separately recorded for each cluster, and position information of the latest TDFL is recorded in each recorded cluster in the TDDS.

At the first stage (stage 1), it is assumed that the TDFL header1 and the TDFL1 are recorded in a single cluster. In the TDDS, information that indicates the position of the latest TDFL is recorded, and in FIG. 8A, this is expressed as P1. The position information indicated by this pointer is the first PSN of this cluster, i.e., address of the corresponding cluster in the optical disc structure. In FIG. 8A, the pointer P1 indicates the first position of the TDFL header1. In the case of a SL disc, the recording unit, e.g., 1 cluster, of the defect management information may be varied from 1 cluster to 4 clusters, and thus 4 pointers are required. In the case of a DL disc, the recording unit of the defect management information may be varied up to 8 clusters, and up to 8 pointers are required.

At the second stage (stage2) in FIG. 8A, new TDFL21 and TDFL22 are further recorded along with the cumulative recording of previous TDFLs (which is represented as TDFL1c) during an update operation. The defect management information is recorded in a once-recordable state in the recording unit of a single cluster on the optical disc of write once type. During the recordation of the defect management information at the second stage (stage2), new TDFL21 and TDFL22, and the cumulative TDFL1c that is identical to TDFL1, are recorded along with the corresponding TDFL header 2 and TDFL header 3 and TDDS2.

The second stage (stage2) refers to the recording method in the case that the list information of the defect management area exceeds a single cluster, but is less than 2 clusters. For example, the TDFL header 2+TDFL1c+TDFL21 equals a single cluster of data, and the TDFL22 is therefore recorded occupying only a partial area of the second successive cluster. The corresponding TDFL header3 is recorded, and the pointer value recorded in the TDDS2 shows that the latest defect information positions are recorded and identified by TDFL pointers P2 and P3.

At the third stage (stage3), new TDFL31 and TDFL32 are further recorded along with the cumulative recording of previous TDFLs (which is represented as TDFL22cc) during the update operation. The defect management information is recorded in a single recording in the recording unit of a single cluster on the optical disc of write once type as described above. During the recordation of the defect management information at the third stage (stage3), TDFL31 and TDFL32, an the cumulative TDFL22c that is identical to TDFL22, are recorded along with the corresponding TDFL header 4, TDFL header 5 and TDDS3. The TDFL header 2, the corresponding TDFL1c and the TDFL21 are not newly recorded, but information that indicates their position P2 is recorded in the TDDS3, so that an unnecessary, repetitive recording is prevented. Therefore, the recording area of the disc is efficiently used and available space for defect management and recording is increased.

If the TDFL22c, TDFL31 and TDFL32 information exceeds a single cluster, but is less than 2 clusters, i.e., the combination of TDFL header 4+TDFL22c+TDFL31 equals a single cluster, the TDFL32 is recorded occupying a partial area of the second successive cluster along with the corresponding TDFL header 5. The pointer value recorded in the TDDS3 shows that the latest defect information positions P2, P4 and P5 are recorded at stage 3.

The latest TDFL information can be obtained using P2, P4 and P5, e.g., the positions of the latest defect management information recorded in the TDDS3. The TDFL header 2, TDFL1c and TDFL21 information can be obtained using the P2 position information indicated by the first TDFL pointer, and the TDFL header 4, TDFL22c and TDFL31 information can be obtained using the P4 position information indicated by the second TDFL pointer. The TDFL header5 and TDFL32 information can be obtained using the P5 position information indicated by the third TDFL pointer.

As discussed in the previous embodiments, a sorting can be performed to sort TDFLs in some order at each stage. For example, at the fourth stage (stage4), the defect management information after the sorting is performed is shown. Here, the defect management information is sorted according to the PSN of the TDFL entry and based on the TDFL entry type (status 1). From a viewpoint of the third stage (stage3), the sorting is performed under the assumption that a new TDFL entry is produced to be included in the P2x position.

Since all the information of TDFL1c, TDFL21, TDFL22c, TDFL31 and TDFL32 are changed through sorting by the P2x, the changed TDFL information is recorded as the TDFL41, TDFL42 and TDFL42, and the corresponding TDFL header 6, TDFL header7 and TDFL header 8 are recorded along with a new TDDS4. Here, in the TDDS4, P6, P7 and P8, which are position information of the latest defect management information are recorded. The TDFL header 6 and the TDFL41 occupy a single cluster, the TDFL header 7 and the TDFL42 occupy a single cluster, and the TDFL header8 and the TDFL43 occupy less than a single cluster. Accordingly, at the fourth stage, the defective area management information exceeds two clusters, but is less than three clusters.

In summary, according to the method of managing defect information on an optical disc of write once type according to the third embodiment of the present invention, the TDFL header and the TDFL are recorded in the recording unit of a single cluster whenever the TDFL is updated. If the TDDS expresses the position of the latest defect management information, and the recording is performed in excess of a single cluster, repeated recordings are minimized using the information that represents the position of the latest defect management information, and the latest defect management information can be efficiently and promptly obtained.

Meanwhile, in FIG. 8A, the defect management information may be obtained when the corresponding header has information with respect to the corresponding TDFL contents. Alternatively, the defect management information may be obtained when the latest TDFL header includes all of the TDFL information. For example, at the second stage (stage2), the TDFL header 2 only has information with respect to the contents of the TDFL1c and TDFL21, and the TDFL header 3 only has information on the contents of the TDFL22. Therefore, all the information related to the corresponding defective area can be obtained by processing all entry information of all the headers indicated by the position of the latest defect management information.

However, the TDFL header 5 includes information on the entire contents of the TDFL1c, TDFL21, TDFL22c, TDFL31, and TDFL32. In this case, all the information relating to the entire defective area can be obtained by the contents of only the latest TDFL header.

In FIG. 8A, the TDFL header also has information that indicates the number of clusters currently used. A flag for representing how many clusters are used in representing the defect management area list can be employed. Since the size of the defect management information is variable, this flag can be particularly helpful. It is also possible to record information representing the number of clusters currently used in not only the TDFL header, but also in the TDDS.

FIG. 8B shows an example of table that represents the change of the TDFL pointers by stages according to the third embodiment of the present invention. In the third embodiment, eight pointers are required at a maximum, and the pointers that are not used at the respective stages are set to zero. The concept of FIG. 8B is identical to that of FIG. 7B and thus is not discussed in further detail hereinafter.

Figure 9A:
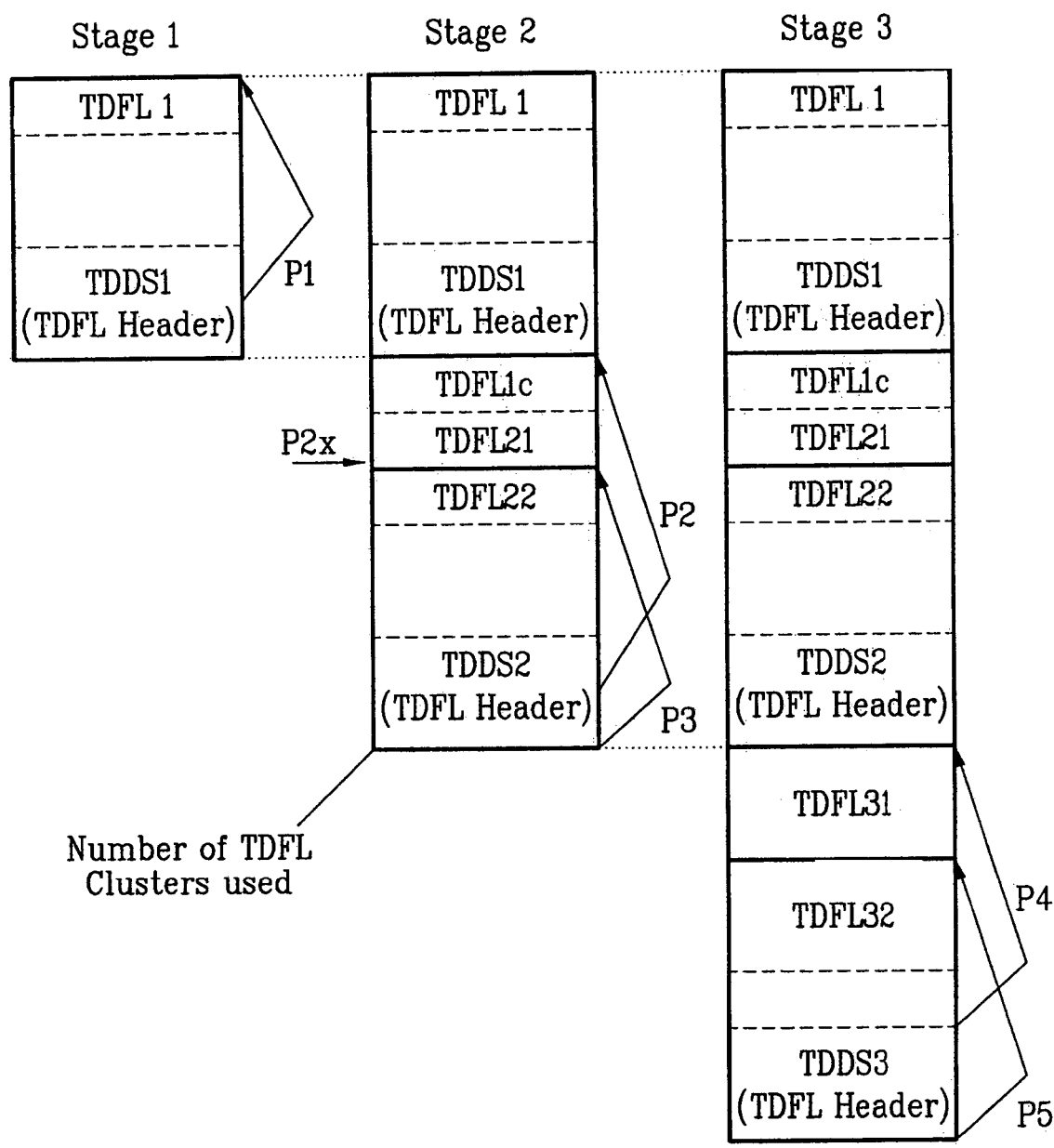

FIGS. 9A and 9B illustrate a method of managing defect information on an optical disc of write once type according to the fourth embodiment of the present invention. According to the method of managing defect information according to the fourth embodiment of the present invention as shown in FIG. 9A, the latest TDFL is repeatedly recorded cumulatively with the previous TDFL in one cluster. However, the TDFL is separately recorded for each cluster, and position information of the latest TDFL is recorded in each recorded cluster in the TDDS. In comparison to the third or other previous embodiments, the header that indicates the TDFL is not placed in the leading edge of the TDFL, but is placed in the TDDS. This can prevent complicated rules for recording the TDFL header information by recording the TDFL header in the TDDS. In this configuration, a TDFL header may not be needed for each cluster, but can be provided once at each update stage. The TDDS is typically composed of 2048 bytes, the TDFL header of about 60 bytes, and the existing TDDS information usually does not exceed 100 bytes. Accordingly, there is no trouble in performing the recording in the TDDS.

FIG. 9B shows an example of a table that represents the change of the pointer of the TDFL by stages according to the fourth embodiment of the present invention. In the fourth embodiment, eight pointers are required at a maximum in the same manner as the third embodiment, and the pointers that are not used at the respective stages are set to zero.

It will be apparent to those skilled in the art that various modifications and variations can be made in the present invention without departing from the spirit or scope of the present invention. Thus, it is intended that the present invention cover the modifications and variations of this invention provided they come within the scope of the appended claims and their equivalents.

What is claimed is:

1. A meted far managing an optical recording medium having at least one defective area in a user data area, said method comprising:
   recording a temporary defect list in a temporary defect management area, wherein the temporary defect list is recorded as defect management information for managing the at least one defective area; and
   recording at least one temporary defect list pointer as position information indicating a start position of a respective recording unit in the recorded temporary defect list in the temporary defect management area.

2. The method according to claim 1, wherein each recording unit of the temporary defect list is a cluster.

3. The method according to claim 2, wherein the number of the recording units of the temporary defect list ranges from one cluster to eight clusters.

4. The method according to claim 1, wherein the temporary defect list pointer contains a single physical sector number irrespective of the size of the temporary defect list.

5. The method according to claim 2, wherein the temporary defect list has a recording size of at least one cluster, and the temporary defect list further includes information that indicates the number of clusters currently used.

6. The method according to claim 1, wherein the temporary defect list includes a header for identifying the corresponding temporary defect list.

7. The method according to claim 6, wherein a single header is provided irrespective of the size of the temporary defect list.

8. The method according to claim 1, wherein the temporary defect list is recorded cumulatively with a previous temporary defect list in the temporary defect management area.

9. The method according to claim 1, wherein a single header is provided for each recording unit of the temporary defect list.

10. The method according to claim 1, wherein the number of temporary defect list pointers for the temporary defect list is equal to the number of recording units in the same temporary defect list.

11. A recording medium comprising:
   a user data area within a data area; and
   a temporary defect management area for recording defect management information, wherein the defect management information is provided for managing replacement data of at least one defective area within the user data area of the recording medium, the temporary defect management area including a first area for recording a temporary defect list as defect management information, and a second area for recording at least one pointer as position information that indicates a start position of a respective recording unit of the temporary defect list.

12. The recording medium according to claim 11, wherein each recording unit of the temporary defect list is one cluster.

13. The recording medium according to claim 12, wherein the number of the recording units of the temporary defect list ranges from one cluster to eight clusters.

14. The recording medium according to claim 11, wherein the temporary defect list includes a header for identifying the temporary defect list.

15. The recording medium according to claim 11, wherein the most recent temporary defect list is cumulatively recorded with a previous defect list as the defect management information.

16. The recording medium according to claim 11, wherein a single header is provided for each recording unit of the temporary defect list.

17. The recording medium according to claim 11, wherein the number of temporary defect list pointers for the temporary defect list is equal to the number of recording units in the same temporary defect list.

18. An apparatus for managing an optical recording medium having at least one temporary defect management area, and a spare area in a data area, said apparatus comprising:
 a recording device configured to record a temporary defect list in a temporary defect management area, wherein the temporary defect list is recorded as defect management information for managing at least one defective area, and to record position information as at least one temporary defect list pointer indicating a start position of a respective recording unit in the recorded temporary defect list in the temporary defect management area.

19. The apparatus for claim 18, wherein the temporary defect list is recorded cumulatively with a previous temporary defect list in the temporary defect management area.

20. The apparatus according to claim 18, wherein a single header is provided for each recording unit of the temporary defect list.

21. The apparatus according to claim 18, wherein the number of temporary defect list pointers for the temporary defect list is equal to the number of recording units in the same temporary defect list.

22. A method for managing an optical recording medium having at least one defective area in a user data area, said method comprising:
 recording a temporary defect list in a temporary defect management area, wherein the temporary defect list is recorded as defect management information for managing the at least one defective area; and
 recording at least two temporary defect list pointers as position information indicating respectively positions of at least two recording units in the temporary defect list in the temporary defect management area.

* * * * *